United States Patent [19]
Brocoff

[11] 3,956,460
[45] May 11, 1976

[54] PROCESS FOR THE TREATMENT OF GAS STREAMS CONTAINING HYDROGEN CYANIDE

[75] Inventor: Jack Brocoff, Fullerton, Calif.

[73] Assignee: Ralph M. Parsons Company, Pasadena, Calif.

[22] Filed: Nov. 5, 1973

[21] Appl. No.: 412,953

[52] U.S. Cl.............................. 423/221; 423/222; 423/236; 423/238; 423/355; 423/366; 423/564

[51] Int. Cl.² ........................................ B01D 53/34

[58] Field of Search ........... 423/221, 236, 238, 222, 423/366, 224, 355, 564

[56] References Cited
UNITED STATES PATENTS

| | | | |
|---|---|---|---|
| 1,580,038 | 4/1926 | Halvorsen | 423/355 |
| 2,008,253 | 7/1935 | Klempt | 423/366 X |
| 3,086,838 | 4/1963 | Giammarco | 423/223 |
| 3,849,540 | 11/1974 | Maddox et al. | 423/224 |
| 3,855,390 | 12/1974 | Matumoto et al. | 423/236 |

FOREIGN PATENTS OR APPLICATIONS

| | | | |
|---|---|---|---|
| 1,182,255 | 2/1970 | United Kingdom | 423/224 |
| 848,834 | 9/1960 | United Kingdom | 423/224 |

*Primary Examiner*—Earl C. Thomas
*Attorney, Agent, or Firm*—Christie, Parker & Hale

[57] ABSTRACT

Ammonia, hydrogen cyanide and hydrogen sulfide contained in gas streams are separated from the gas streams by contacting the gas stream with an aqueous solution containing free oxygen for a time sufficient for the ammonia, hydrogen sulfide and hydrogen cyanide to react with the oxygen present to form ammonium thiocyanate and water for further treatment or disposal.

One method of treatment is to thermally and catalytically convert for the ammonium thiocyanate to ammonia or nitrogen and hydrogen sulfide in the form of a second gas stream which is processed for recovery of any formed ammonia and the hydrogen sulfide.

12 Claims, 1 Drawing Figure

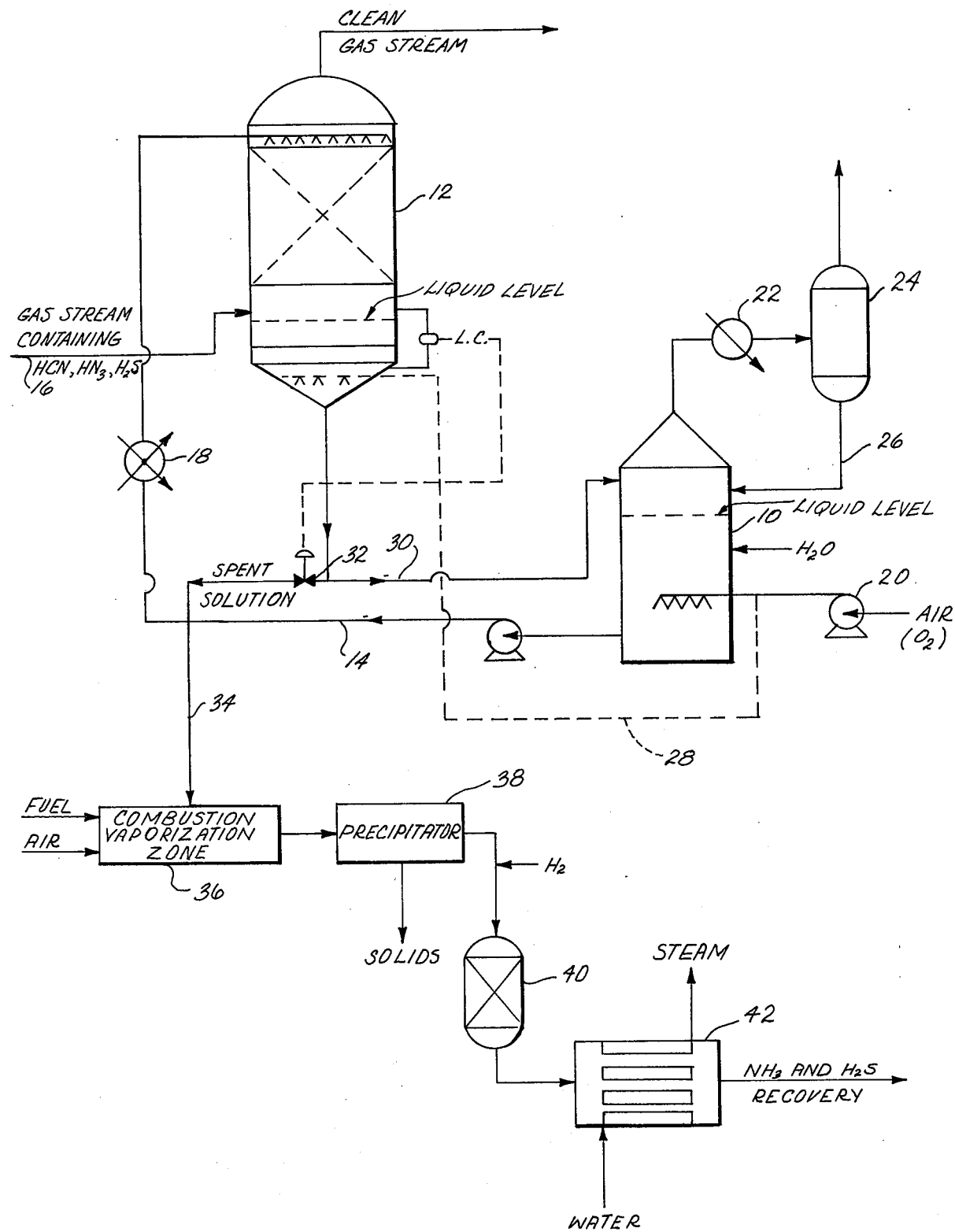

PROCESS FOR THE TREATMENT OF GAS STREAMS CONTAINING HYDROGEN CYANIDE

BACKGROUND OF THE INVENTION

In the treatment of fuel gases such as coke oven gases and the like which contain ammonia, hydrogen cyanide and hydrogen sulfide a common treating method is to contact the gas stream with an ammonium polysulfide wash. In this technique the ammonium polysulfide reacts with the hydrogen cyanide and ammonia to form ammonium thiocyanate, the reaction being represented by the following equation:

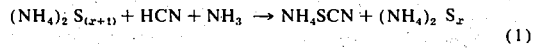

$$(NH_4)_2 S_{(x+1)} + HCN + NH_3 \rightarrow NH_4SCN + (NH_4)_2 S_x \quad (1)$$

In the practice of this method, finely divided sulfur is added to the solution in order to maintain the sulfur concentration required to convert all or nearly all of the hydrogen cyanide to ammonium thiocyanate.

The process is deficient in that it requires the constant addition of sulfur to the solution representing a raw material expense. In addition to the difficulties presented in dissolving the sulfur, problems exist with respect to disposal of the ammonium thiocyanate which is toxic in nature without causing pollution problems.

It has been proposed by others to incinerate the waste liquor to form a sulfurous vapor which is hydrogenated to form hydrogen sulfide. The hydrogen sulfide so formed is removed from the gas stream by conventional processes such as the Stretford Process in which the hydrogen sulfide is converted to sulfur.

If sulfur is added to the system in order to remove the hydrogen cyanide and the sulfur subsequently converted to hydrogen sulfide which is, in turn, reconverted into sulfur, it introduces a sulfur recycle stream to the process which increases the load on the hydrogen sulfide removal processing steps.

For example, in the treatment of 45 million standard cubic feet of coke oven gas typically containing about 15,125 lbs. of sulfur as hydrogen sulfide and 3,857 lbs. of hydrogen cyanide, it is required that at least 4,571 lbs. of sulfur be present to react to the hydrogen cyanide to form ammonium thiocyanate.

When the ammonium thiocyanate is subsequently converted to hydrogen sulfide and ammonia, it represents an increase in the hydrogen sulfide content of the gas stream by a factor of at least 1.3. This represents the ideal case which assumes 100% utilization of the sulfur in the solution prior to the subsequent reduction of hydrogen sulfide which is in turn converted to sulfur which must in part be recycled. More typically, the excess of sulfur is present in the solution for effective reaction of hydrogen cyanide and the factor is usually about 1.5 times or more.

As a consequence, this necessitates the use of a correspondingly larger and more costly hydrogen sulfide removal plant and increases the operating cost of this plant in proportion to the increased amount of hydrogen sulfide throughout.

SUMMARY OF THE INVENTION

According to the present invention, gas streams containing hydrogen cyanide, hydrogen sulfide and ammonia, such as coke oven gas, are treated for removal of these constituents by an aqueous absorption solution containing free oxygen in which the hydrogen cyanide reacts with oxygen, hydrogen sulfide and ammonia to form ammonium thiocyanate and water by the reaction:

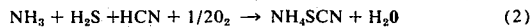

$$NH_3 + H_2S + HCN + 1/2O_2 \rightarrow NH_4SCN + H_2O \quad (2)$$

and yield a gas stream essentially free of hydrogen cyanide and substantially reduced in hydrogen sulfide and ammonia.

The ammonia and hydrogen sulfide required for the reaction are normally present in the gas stream or where necessary provided, in part, by the aqueous solution.

The solution which retains the ammonium thiocyanate, when it becomes spent, is disposed of or preferably treated for conversion of the ammonium thiocyanate to hydrogen sulfide and ammonia and/or nitrogen. The amount of hydrogen sulfide to be removed from the gas stream as sulfur is the same as the hydrogen sulfide content of the treated gas stream rather than a system containing 1.3 to 1.5 times the amount of hydrogen sulfide present in the gas stream. In particular, the gas stream, such as a coke oven gas stream, is normally brought into contact with an aqueous absorption solution in which the total dissolved solids content is approximately 170 to 230 grams per liter.

Of this, the thiocyanate ion will be present in an amount from about 95 to about 140 grams per liter, thiosulfate ion in an amount up to about 20 grams per liter, sulfate ion in an amount up to 0.5 grams per liter, ammonia in an amount from 20 to 55 grams per liter, free sulfur in an amount up to about 55 grams per liter and dissolved free oxygen in an amount up to solution saturation at the temperature employed.

Because the reaction is favored by operating at elevated temperatures, the temperature of the solution employed in treating the gas stream preferably ranges from about 60° to about 150°F.

As a portion of the solution becomes spent, it is preferably treated for conversion of ammonium thiocyanate to hydrogen sulfide and ammonia and/or nitrogen.

The preferred method for treating the spent solution is to admix the solution with products of combustion of fuel and air or an oxygen containing gas stream in proportions which form a resultant gas mixture at a temperature of about 700°F or more. This results in total vaporization of the constituents of the spent solution with attendant decomposition of ammonium thiocyanate to form a vapor stream comprising of water, hydrogen cyanide, ammonia and hydrogen sulfide. The resultant gas stream is then passed to the catalytic conversion zone containing a catalyst comprising at least one sulfided metal of Groups IVa, Va, the third period of Group VIII and the Rare Earth Series of the Periodic Table supported on alumina, silica or alumina-silica for a time sufficient to hydrolyze the hydrogen cyanide to ammonia and/or nitrogen and simultaneously hydrogenate in the presence of a source of hydrogen or a hydrogen donor, sulfur and sulfur dioxide, if present, to hydrogen sulfide. The gas stream is then cooled to a temperature consonant for the removal of ammonia and hydrogen sulfide by known techniques.

THE DRAWING

The attached drawing illustrates one scheme for treating gas streams containing ammonia, hydrogen cyanide and hydrogen sulfide and for treating spent solutions to eliminate hydrogen cyanide to permit safe removal of hydrogen sulfide and ammonia.

DESCRIPTION

The process of the present invention comprises, in general, contacting a gas stream, such as coke oven fuel gas which contains hydrogen cyanide, ammonia and hydrogen sulfide as impurities with an aqueous solution containing free oxygen for a time sufficient for the ammonia, hydrogen sulfide and hydrogen cyanide to react with the oxygen present by the general reaction:

$$NH_3 + H_2S + HCN + 1/2O_2 \rightarrow NH_4SCN + H_2O \quad (2)$$

to form ammonium thiocyanate and water and a gas stream essentially free of hydrogen cyanide and substantially reduced in ammonia and hydrogen sulfide.

A portion of the liquor as it contains the products of reaction is then discarded or further treated, preferably by vaporization by admixture with the products of combustion in a vaporization zone to totally gasify the spent liquor and convert the ammonium thiocyanate to ammonia, hydrogen sulfide and hydrogen cyanide and then passed to a catalytic conversion zone where the hydrogen cyanide is converted to ammonia and/or nitrogen.

If excess oxygen is present, sulfur dioxide may be formed which when passed through the catalytic conversion zone where sulfur, if present, is hydrogenated to hydrogen sulfide, and where sulfur dioxide is also hydrogenated to hydrogen sulfide.

The resultant gas stream which contains ammonia and hydrogen sulfide is then processed by conventional means for extraction of ammonia and hydrogen sulfide prior to venting the gas stream to the atmosphere.

Because oxygen is used to convert the extracted hydrogen sulfide, ammonia and hydrogen cyanide to ammonium thiocyanate as opposed to an ammonium polysulfide solution, equipment requirements for removal of hydrogen sulfide are only those necessary to cope with the original sulfur present as hydrogen sulfide as opposed to additional hydrogen sulfide generated when an ammonium polysulfide wash is used to remove hydrogen sulfide, hydrogen cyanide and ammonia from the gas stream.

With reference now to the Drawing, the aqueous oxygen containing solution from oxidizing tank 10 is passed to wash tower 12 by line 14 in countercurrent flow with the fuel gas containing hydrogen cyanide, ammonia and hydrogen sulfide entering wash tower 12 by line 16.

The temperature of the wash solution entering wash tower 12 is controlled and either cooled or heated depending upon the temperature desired using heat exchanger 18.

In general, the composition of the solution entering wash tower 12 has a total dissolved solids content of from 170 to 230 grams per liter of which thiocyanate ion is present in an amount of from about 95 to about 140 grams per liter thiosulfate ion in an amount of from 0 to about 20 grams per liter, sulfite ion in an amount of from 0 to about 0.5 grams per liter, these being associated with about 20 to about 55 grams per liter of the dissolved ammonia. There may also be present up to about 55 grams per liter free sulfur, the balance of the solution is essentially water and oxygen in an amount up to solution saturation at the temperature and pressure employed.

Oxygen is supplied to the solution in oxidation tank 10 by air blower 20 which bubbles air through the solution. Exhaust gases leaving tank 10 are passed through cooler 22 and knock out pot 24 before being vented to the atmosphere. The solution condensed in condenser 22 returns to oxidizing tank 10 by line 26.

If desired, air can also be pumped directly into the wash tower 12 for the required reactions by line 28.

In wash tower 12 the gas stream while flowing in countercurrent flow with the liquid in wash tower 12 is subjected to the following reactions:

$$2NH_3 + 2H_2S + 2O_2 \rightarrow (NH_4)_2S_2O_3 + H_2O \quad (3)$$

$$(NH_4)_2S_2O_3 + 2HCN \rightarrow 2NH_4SCN + H_2O + O_2 \quad (4)$$

In reaction (3), the ammonia and hydrogen sulfide combine with oxygen which is present to form ammonium thiosulfate and water. The ammonium thiosulfate then reacts by reaction (4) with hydrogen cyanide to form ammonium thiocyanate, water and releasing some of the oxygen back to the wash solution.

The reactions may be carried out at any desired temperature or pressure. However, it is expedient to carry out the reactions at moderately elevated temperatures, with solution temperatures from about 60° to about 150°F being conveniently employed.

The solution withdrawn from the base of wash tower 12 is split. A portion is returned to oxidizer tank 10 by line 30, and the balance discarded with the general proviso that a liquid level control valve 32 is made available to draw off a portion of the passage to an incinerator or other disposal means, in order to maintain a constant level in the base of the wash tower 12.

Incineration may be made by any convenient means. For instance, if the total sulfur content is sufficiently low, the discarded portion of the wash liquor may be simply burned provided the SO₂ content of the flue gas stream is within acceptable standards for emissions.

The solution which is returned to oxidizer tank 10 is provided with make-up oxygen and water for return to wash tower 12 by line 14.

The balance of the solution withdrawn from wash tower 12 which is regarded as spent solution and is preferably passed by line 34 to combustion-vaporization zone 36 where it is admixed with the products of combustion of a fuel with oxygen, normally provided as air, in proportions such that there is formed a resultant vaporized gas stream having a temperature of from about 700°F to about 2000°F or more in which the materials dissolved or entrained in the aqueous solution are vaporized and where the ammonium thiocyanate is decomposed to hydrogen cyanide, ammonia and hydrogen sulfide.

If excess oxygen is present in the combustion products, sulfur dioxide may also be formed. If the aqueous spent solution contains tars, complete gasification of the tars requires a higher resultant gas temperature, namely a temperature of about 1000°F or more.

Total vaporization of the aqueous spent solution may be achieved by simply spraying the aqueous spent solution into a combustion chamber where a hydrocarbon fuel such as a fuel gas, or oil, preferably a fuel capable of burning with little or no soot formation is consumed in the presence of oxygen, typically air.

In combusting the fuel, the fuel to air ratio is preferably adjusted such that the products of combustion contain little or no residual oxygen to minimize the formation of sulfur dioxide.

More preferably, the fuel is burned in a deficiency of oxygen to produce hydrogen and carbon monoxide, the latter being subsequently converted to hydrogen by a water-gas shift reaction in a subsequent catalysis zone.

An alternative convenient method of totally gasifying the aqueous spent solution is to combine the products of combustion and the aqueous spent solution in a fluidized bed (not shown) containing an inert material such as sand which serves as a heat sink to provide the heat required to totally gasify the aqueous spent solution.

After the gasification step the resultant vapors are passed to a catalysis zone where the hydrogen cyanide is hydrolyzed to ammonia and/or nitrogen, depending on the temperature employed. Any sulfur and sulfur dioxide present are simultaneously hydrogenated to hydrogen sulfide in the presence of internally formed or externally generated hydrogen.

This is accomplished by passing the gasified stream from the combustion-vaporization zone 36, optionally through a precipitation zone 38 where any solids entrained in the gas stream, such as from a fluidized bed may settle out, then to a catalytic reactor 40 containing the sulfide of one or more metals selected from Group Va, Group VIa, the third period of Group VIII and the Rare Earth Series of the Periodic Table as defined by Mendeleef and published in the Periodic Chart of the Atoms by W. N. Welch Manufacturing Company, incorporated herein by reference, deposit on a support such as alumina, silica or alumina-silica.

In the preferred embodiment, the catalyst contains one or more sulfides of the metals iron, nickel, cobalt, molybdenum, vanadium, thorium, uranium and the like deposited or co-precipitated on the support.

The most preferred catalyst is a supportd sulfide of cobalt and molybdenum which is capable of completely hydrolyzing hydrogen cyanide to ammonia and/or nitrogen as well as hydrogenate sulfur and sulfur dioxide to hydrogen sulfide at temperatures of about 700°F or more at a space velocity of 1000 volumes of the gasified stream per hour (measured at standard conditions) per unit volume of catalyst at atmospheric pressure and where the gasified stream contains sufficient hydrogen and/or carbon monoxide which generates hydrogen by a water-gas shift reaction to form hydrogen for the hydrogenation reaction.

Other catalysts such as a support uranium-thorium iron or nickel may be used effectively at higher temperatures such as 1000°F or more or where the space velocity is reduced.

As indicated, hydrogen is required in the gas stream where sulfur and sulphur dioxide are present in a concentration at least equal to that required to hydrogenate the sulfur and sulfur dioxide to hydrogen sulfide in hydrogenation/hydrolysis reactor 40.

Hydrogen may be supplied ahead of the hydrogenation/hydrolysis reactor 40 by any convenient method including admixture of a hydrogen containing gas with the gasified vapors.

A convenient alternative is to operate the combustion zone with a deficiency of air to produce hydrogen and carbon monoxide, the latter being converted to hydrogen by a water-gas shift reaction catalyzed by the hydrogenation/hydrolysis catalyst employed in reactor 40.

Following completion of the hydrolysis and hydrogenation reactions, the vapor stream is cooled and treated for removal of ammonia and hydrogen sulfide by known methods.

The gas stream, for instance, may be cooled by passage through waste heat boiler 42 to a temperature consonant for removal of ammonia and hydrogen sulfide.

A most expedient way of removing the ammonia is to contact the gas stream with either sulfuric or phosphoric acid to form ammonium sulfate or ammonium phosphate which settle from the liquor as crystals and may be recovered therefrom by any conventional means as products of commerce. In the alternative, ammonia can be extracted as such.

With respect to the removal of hydrogen sulfide, any number of extraction methods are feasible with absorption methods being preferred.

For instance, the cooled process gas may be passed through alkaline absorption solutions which are continuously regenerated by oxidation to produce sulfur, using catalysts such as sodium vanadate, sodium anthraquinone disulfonate, sodium arsenate, sodium ferrocyanide, iron oxide, iodine and like catalysts.

A convenient alternative is to use regenerative absorption solutions such as amines, sulfonate, potassium carbonate and the like. These solutions being typically regenerated by steam stripping to produce hydrogen sulfide.

The preferred extraction system is that known as the "Stretford Process" which employs a solution containing sodium carbonate, sodium vanadate, sodium anthraquinone disulfonic acid and the like as the absorbent used in the absorber. The absorbed hydrogen sulfide is oxidized by absorbent to form sulfur in an absorber and time tank and the absorption solution regenerated by oxidation typically using air as the oxidizer.

The sulfur is recovered from the solution by conventional means such as flotation, filtration, centrifuging, melting decanting under pressure and the like.

In carrying out the process of this invention, it is also feasible to convert the hydrogen cyanide in catalysis zone 40 directly to inert nitrogen by maintaining a reducing atmosphere in the catalysis zone and raising the temperature at which hydrolysis is carried out. This can eliminate in whole or in part the need for extracting ammonia at the expense of operating at higher conversion temperatures.

What is claimed is:

1. A process for the removal of ammonia, hydrogen cyanide and hydrogen sulfide contained in gas streams which comprises:
   a. contacting the gas stream with an aqueous oxygen containing absorption solution in which thiocyanate ion is present in an amount of from about 95 to about 140 grams per liter; thiosulfate ion in an amount up to 20 grams per liter; sulfite ion in an amount up to 0.5 grams per liter; ammonia in an amount of from about 20 to about 55 grams per liter; sulfur in an amount up to about 55 grams per liter and free oxygen in an amount up to solution saturation for a time sufficient for the ammonia, hydrogen cyanide and hydrogen sulfide to react with the contained oxygen to form an aqueous solution containing ammonium thiocyanate, and a gas stream essentially free of hydrogen cyanide and substantially reduced in ammonia and hydrogen sulfide content; and b. disposing of at least a portion of the aqueous ammonium thiocyanate containing solution by:
   i. admixing at least a portion of the ammonium thiocyanate containing solution with the products of combustion of an organic fuel with an oxygen containing gas to form a resultant gas stream at a temperature of at least about 700°F comprising water, hydrogen cyanide, and hydrogen sulfide formed at least as a result of thermal decomposition of ammonium thiocyanate;
   ii. contacting the resultant gas stream with a supported catalyst which contains at least one metal selected from Group Va, Group VIa, the third period of Group VIII, and the Rare Earth Series of the Periodic Table for a time sufficient to at least hydrolyze the contained hydrogen cyanide to form a residual gas stream containing hydrogen sulfide and a nitrogen compound selected from the group consisting of ammonia, nitrogen and mixtures thereof;
   iii. treating the residual gas stream to remove contained ammonia and hydrogen sulfide.

2. A process as claimed in claim 1 in which the aqueous oxygen containing absorption solution is maintained at a temperature from about 60° to about 150°F.

3. A process as claimed in claim 1 in which hydrolysis is carried out at a temperature of from about 1000 to about 2000°F.

4. A process as claimed in claim 2 in which hydrolysis and hydrogenation are carried out at a temperature from about 1000° to about 2000°F.

5. A process as claimed in claim 1 in which the supported catalyst contains cobalt and molybdenum.

6. A process as claimed in claim 2 in which the supported catalyst contains cobalt and molybdenum.

7. A process for the removal of ammonia, hydrogen cyanide and hydrogen sulfide contained in gas streams which comprises. comprises:
   a. contacting the gas stream with an aqueous absorption solution containing free oxygen for a time sufficient for the oxygen to react with the ammonia, hydrogen cyanide and hydrogen sulfide to form a resultant aqueous ammonium thiocyanate solution and a gas essentially free of hydrogen cyanide and substantially free of ammonia and hydrogen sulfide; and
   b. disposing of at least a portion of the resultant aqueous ammonium thiocyanate solution by:
      i. admixing the ammonium thiocyanate solution with the products of combustion of an organic fuel with an oxygen containing gas to form a resultant gaseous stream of at least about 700°F comprising water, hydrogen cyanide, ammonia and hydrogen sulfide formed as a result of thermal decomposition of ammonium thiocyanate;
      ii. contacting the resultant gaseous stream with a supported catalyst which contains at least one metal selected from Group Va, Group VIa, the third period of Group VIII, and the Rare Earth Series of the Periodic Table for a time sufficient to hydrolyze the contained hydrogen cyanide to form a residual gas stream containing hydrogen sulfide and a nitrogen compound selected from the group consisting of ammonia, nitrogen and mixtures thereof;
      iii. treating the residual gas stream to remove contained ammonia and hydrogen sulfide therefrom.

8. A process as claimed in claim 7 in which the aqueous absorption solution is maintained at a temperature from about 60° to about 150°F.

9. A process as claimed in claim 7 in which hydrolysis is carried out at a temperature of from about 1000° to about 2000°F.

10. A process as claimed in claim 7 in which the supported catalyst contains cobalt and molybdenum.

11. A process as claimed in claim 8 in which hydrolysis is carried out at a temperature of from about 1000° to about 2000°F.

12. A process as claimed in claim 11 in which the supported catalyst contains cobalt and molybdenum.

* * * * *